F. A. FROMMANN.
VEHICLE WHEEL.
APPLICATION FILED MAR. 10, 1913.

1,292,299.

Patented Jan. 21, 1919.
3 SHEETS—SHEET 1.

Witnesses:
Robert F. Weir
Arthur W. Carlson

Inventor
Franklin A. Frommann
by Lotz + Scheible
Attys

F. A. FROMMANN.
VEHICLE WHEEL.
APPLICATION FILED MAR. 10, 1913.
1,292,299.
Patented Jan. 21, 1919.
3 SHEETS—SHEET 2.
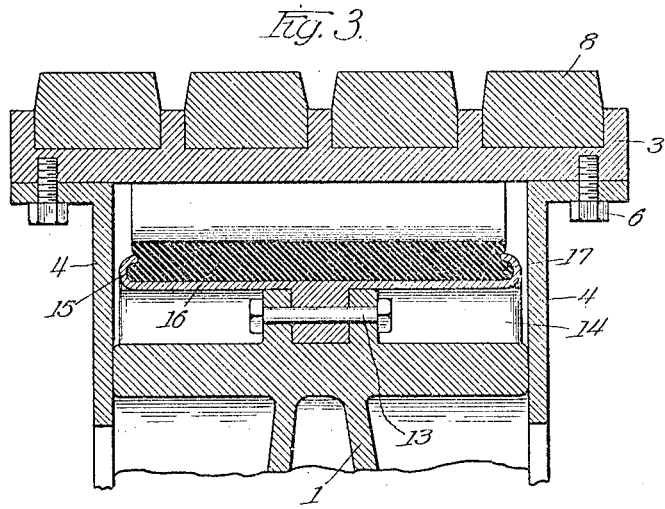
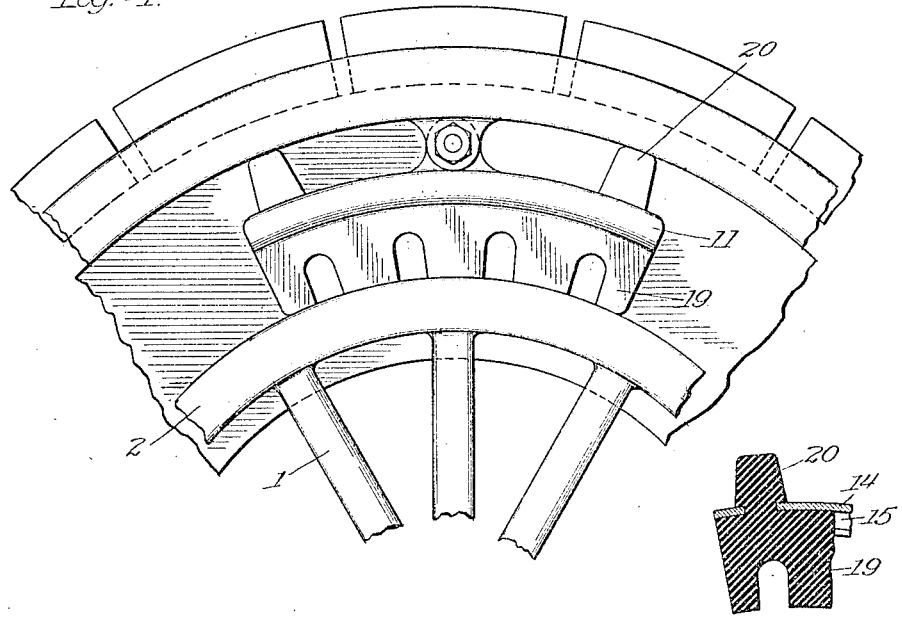
Witnesses:
Robert F. Weir
Arthur W. Carlson
Inventor:
Franklin A. Frommann
by Lotz + Scheible Attys.

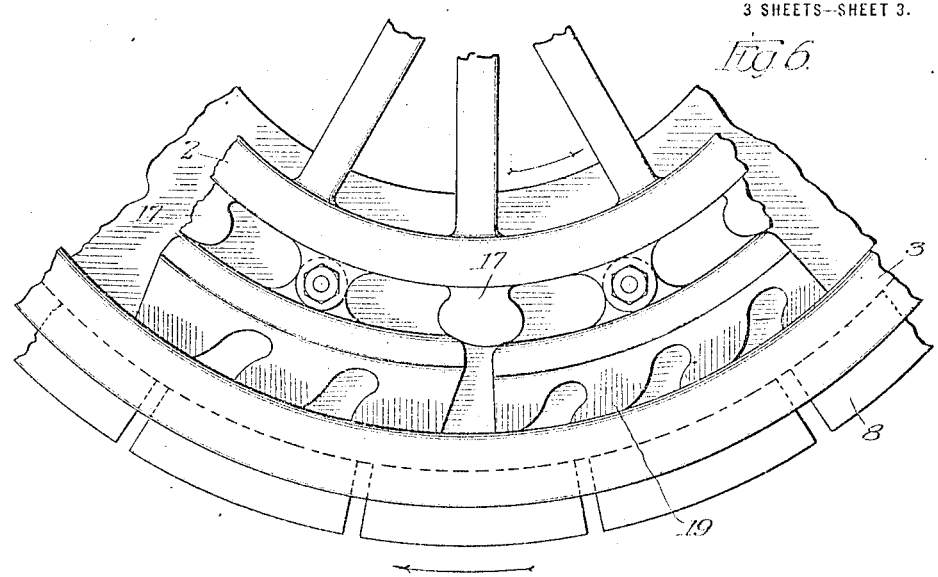
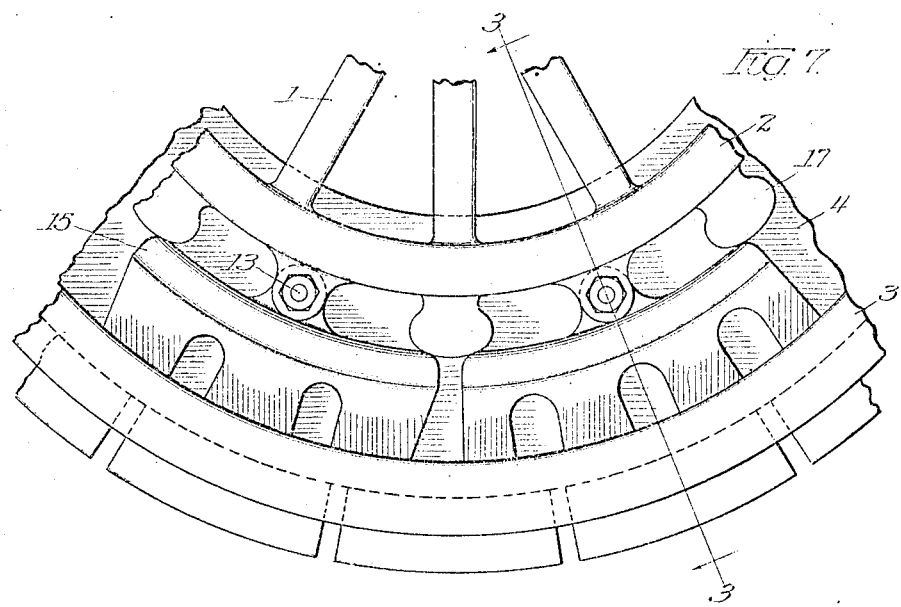

UNITED STATES PATENT OFFICE.

FRANKLIN A. FROMMANN, OF CHICAGO, ILLINOIS.

VEHICLE-WHEEL.

1,292,299.  Specification of Letters Patent.  Patented Jan. 21, 1919.

Application filed March 10, 1913. Serial No. 753,322.

*To all whom it may concern:*

Be it known that I, FRANKLIN A. FROMMANN, a citizen of the United States, residing at Chicago, in the county of Cook and State of Illinois, have invented certain new and useful Improvements in Vehicle-Wheels; and I do hereby declare the following to be a full, clear, and exact description of the invention such as will enable others skilled in the art to which it appertains to make and use the same.

My invention relates to vehicle wheels of the class having a tire member floatingly carried by the hub member of the wheel. It consists in a novel arrangement of the cushioning elements interposed between the tire and hub members of the wheel, whereby these resilient elements may adapt themselves to the changes in relative centricity of the tire and hub members, so as to distribute the cushioning action over a larger portion of the resilient elements.

The prime object of my invention is to provide tiltable supports for the cushions interposed between the rim and tire members of a wheel of this class, and to provide cushioning bumpers for limiting the relative tilting of the said supports. Another object is to provide one or more annular ribs upon the tire member of the wheel which will simultaneously stiffen the said tire member and act as supports for the tiltingly mounted cushioning elements. Other objects will appear from the accompanying drawings, in which—

Figure —1— is a fragmentary side view, partly in section, of a wheel embodying my invention.

Fig. —2— is a section through Fig. —1— along the line 2—2.

Fig. —3— is a section through an alternative embodiment of my invention taken on the line 3—3 of Fig. 7.

Figs. 4 and 7 are fragmentary side views showing alternative embodiments of my invention.

Fig. 5 is a fragmentary section through the cushion-carrier and cushion of Figs. 1 and 4 along a plane transverse to the axis of the wheel.

Fig. 6 is a view similar to Fig. 7 but with the cushioning elements distorted under strain.

Figure 1:
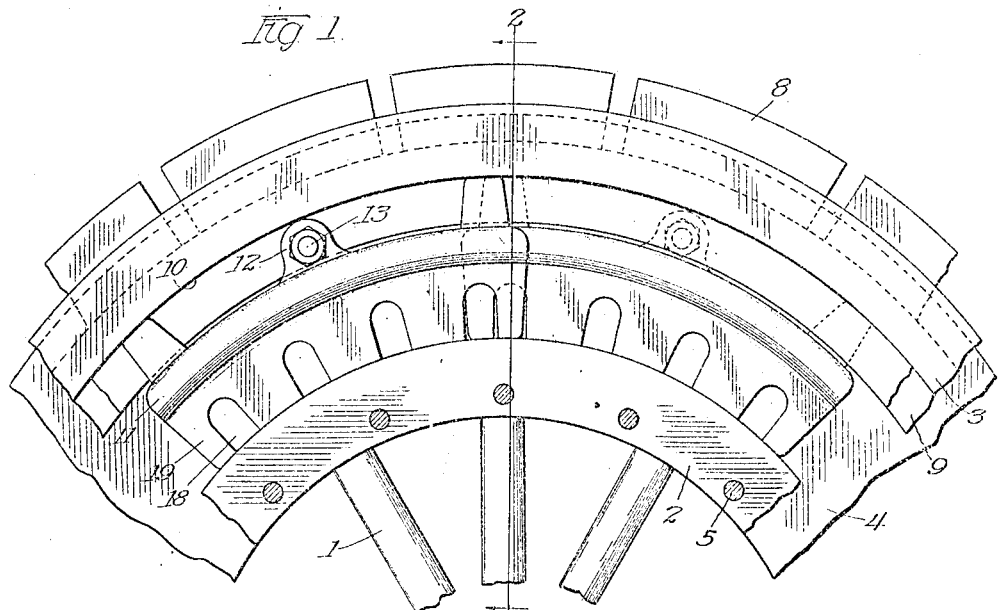
Figure 2:
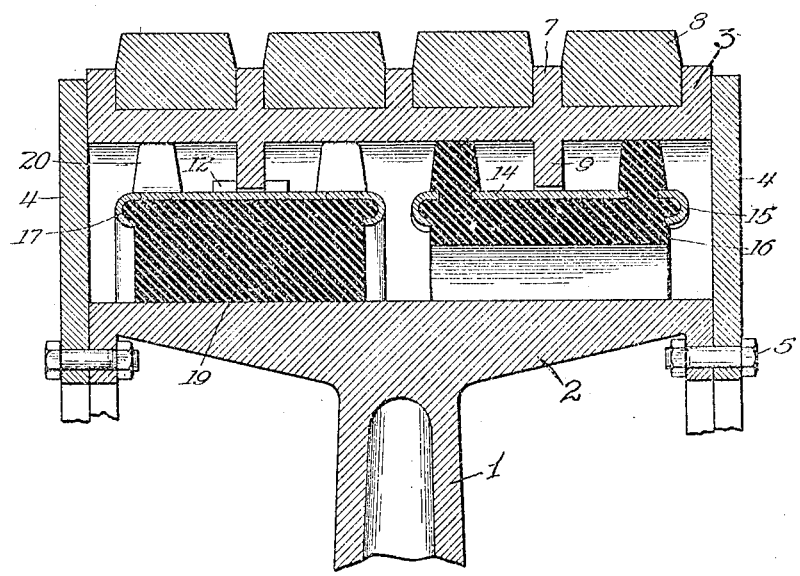

In the drawings, the wheel of my invention includes a hub member equipped with spokes 1 supporting a rim formation 2, a tire-carrying annular member 3, and side flanges 4 adapted to hold the hub member and the tire-carrying member in lateral alinement. The side flanges may be secured to the rim 2 of the hub member (as in Fig. —2—) by bolts 5, in which case they have radial sliding engagement with the edges of the tire member 3. Or, the side flanges may be fastened by bolts 6 to the tire member 3 (as in Fig. —3—) and may have lateral engagement with the rim of the hub member of the wheel. In either case the spacing between the side flanges is made substantially equal to the width of the member laterally engaged between the same, so that they will prevent lateral movement of the tire member relative to the hub member, while permitting relative radial and circumferential movement of the said members.

In the embodiment of Fig. —1—, the tire member 3 has a plurality of radially outward ribs 7, between which tread blocks 8 are mounted upon the tire member, and also has a pair of annular rib formations 9 extending radially inward from the inner cylindrical surface 10 of the member 3. The annular ribs 9 serve as stiffeners for the tire rim 3 and also as supports for cushion-carriers 11, each of which carriers has a bifurcated lug 12 by means of which it is pivoted upon a bolt 13 extending transversely through the lug 12 and one of the ribs 9. The cushion-carrier 11 preferably consists of a longitudinally arcuate body having a back 14 and a pair of lateral grooved formations 15, the latter directed radially inward of the wheel and facing each other.

Mounted in the carrier 11 and held therein after the manner customary with rubber cushioning having laterally projecting base formations, is a resilient or cushioning element 16 having laterally projecting portions 17 engaged by the said grooved formations 15. The cushion 16 is of such height radially of the wheel as to engage the rim 2 of the hub member in a direction substantially radial of the wheel, the rim-engaging portion of the cushion being preferably divided by transverse channels 18 into a plurality of legs 19 each of which may be independently flexed and compressed while frictionally engaging the rim.

When the wheel is free from strains, as in Fig. —1—, the cushion-carriers 11 which are pivotally mounted in annular succession upon the stiffening ribs 9 will have their backs 14 substantially concentric with both the rim 2 and the tire member 3. Upon straining the wheel (as by using it on a loaded vehicle), the rim 2 and the tire member 3 will no longer be concentric with respect to each other and the resulting strains upon the cushion 16 would be confined largely to one end of the same if this cushion were rigidly mounted upon one of the said members between which it is interposed. Being tiltably mounted, however, the cushion-carrier 11 will tilt so as to maintain the feet of the pediferous cushion substantially concentric with the member against which they bear. Instead of pivoting the cushion-carriers to the tire member (as in Fig. —1—) they may be pivotally mounted upon the hub member (as in Figs. —6— and —7—), in which case the opposed grooved formations 15 will be radially outward of the arcuate body 14 of each carrier. Then when the strains upon the wheel compress and distort the tips of the cushion (as in Fg. —7—) the pivotal mounting will permit the cushion-carrier to adjust itself to the changes in the relative centricity of the hub member of the wheel and of the tire member floatingly mounted thereon.

To prevent the cushion-carrier from tilting too easily in case of sudden strains upon the wheel, I preferably interpose cushioning bumpers between the ends of the cushion-carrier and the member upon which the same is pivotally mounted. These bumpers may be secured to the member upon which the tilting carriers are mounted, as in Fig. 6, in which case each bumper 17 may engage the adjacent ends of two of the carriers. Or, the bumpers may also be mounted upon the cushion-carriers, in which case they are preferably formed integral with the cushions, as shown in Figs. —1—, —2—, —4—, and —5—.

For comparatively narrow wheels, the cushions may be arranged in a single annular formation, as in Fig. —3—, while for wheels with wide rims I preferably arranged them in a plurality of laterally disposed annular formations, the carriers and cushions in the laterally adjacent annular series being in staggered relation to each other. By this staggering the cushions, there will be no unsupported portion of the tire member opposite the gap between the ends of the cushions, as the overlapping due to their staggered relation will distribute the supporting over the entire circumference of the wheel.

While I have spoken of the pivoting lug on the cushion-carrier as bifurcated and as mounted upon a rib or one of the other wheel members, I do not wish to be limited to this arrangement. Thus, the bifurcation might be upon the hub member of the wheel (as in Figs. —3— and —7—) the coacting lug on the cushion-carrier being laterally solid. Nor do I wish to be limited to the periferous form of cushions, nor to other details which might be varied without departing from the spirit of my invention.

It will be evident that by unbolting the side plates, the tire member of the wheel may be removed therefrom, whereupon any or all of the cushioning members may be detached and replaced.

I claim as my invention:—

1. In a wheel, a hub, a rim member rigid therewith, a tire member surrounding the rim and movable circumferentially and radially with respect thereto, and circumferentially elongated cushion members interposed between the rim and tire members, pivotally mounted between their ends upon one of said members and frictionally engaging the other of said members, and yielding supports interposed between the ends of the cushion members and the member upon which they are mounted.

2. In a wheel, a hub, a rim member rigid therewith; a tire member movable radially and circumferentially with respect to the rim member, one of the said members being equipped upon the face opposed to the other member with an annularly disposed web; and a plurality of cushioning elements each pivoted intermediate its ends upon the said web and each presenting at its ends portions in frictional engagement with the opposed faces of both of the said members.

3. In a wheel, a hub, a rim member rigid therewith; a tire member movable radially and circumferentially with respect to the rim member, one of the said members being equipped upon the face opposed to the other member with an annularly disposed web; a plurality of cushion-carriers pivotally mounted upon the said web, and a cushion fast upon each of the said carriers, the said cushion equipped with a plurality of legs frictionally engaging at least one of the said members, some of said legs disposed at opposite sides of the pivotal mounting of the said carrier.

4. In a wheel, a hub, a rim member rigid therewith; a tire member movable radially and circumferentially with respect to the rim member, a plurality of pivots carried by one of the said members and disposed parallel to the axis of the wheel, an elongated cushion-carrier mounted intermediate of its ends upon each of the said pivots, and a cushion fast upon each of the said carriers and frictionally engaging the other of the said members.

5. In a wheel, a hub, a rim member rigid therewith; a tire member movable radially and circumferentially with respect to the rim member, a plurality of pivots carried by one of the said members and disposed parallel to the axis of the wheel, an elongated cushion-carrier mounted intermediate of its ends upon each of the said pivots, and a cushion fast upon each of the said carriers and having portions frictionally engaging each of the said members respectively.

6. In a wheel, a hub, a rim member rigid therewith; a tire member movable radially and circumferentially with respect to the rim member, one of the said members being equipped upon the face opposed to the other member with an annularly disposed web; and a plurality of cushioning elements tiltingly mounted upon the said web and frictionally engaging the last named member; and bumper formations associated with the member equipped with the said web and with each of the cushioning elements, for limiting the tilting of the latter.

7. In a wheel, a hub, a rim member rigid therewith; a tire member movable radially and circumferentially with respect to the rim member, a plurality of pivots carried by one of the said members and disposed parallel to the axis of the wheel, a cushion-carrier mounted upon each of the said pivots, and a cushion carried by each of the said carriers and having portions frictionally engaging each of the said members respectively, whereby the tilting of the cushion-carriers is yieldingly limited.

In testimony whereof I have signed my name in presence of two subscribing witnesses.

FRANKLIN A. FROMMANN.

Witnesses:
ALBERT SCHEIBLE,
M. M. BOYLE.

Copies of this patent may be obtained for five cents each, by addressing the "Commissioner of Patents, Washington, D. C."